United States Patent
Krieg et al.

(10) Patent No.: US 11,294,997 B2
(45) Date of Patent: Apr. 5, 2022

(54) PAIRING DEVICES TO AN AUTHENTICATION DEVICE BY SENSOR FINGERPRINTING

(71) Applicant: Infineon Technologies AG, Neubiberg (DE)

(72) Inventors: Armin Krieg, Graz (AT); Norbert Druml, Graz (AT)

(73) Assignee: Infineon Technologies AG

( * ) Notice: Subject to any disclaimer, the term of this patent is extended or adjusted under 35 U.S.C. 154(b) by 298 days.

(21) Appl. No.: 16/224,169

(22) Filed: Dec. 18, 2018

(65) Prior Publication Data
US 2020/0193006 A1 Jun. 18, 2020

(51) Int. Cl.
*G06F 21/34* (2013.01)
*G06F 21/45* (2013.01)
*H04L 9/32* (2006.01)

(52) U.S. Cl.
CPC .............. *G06F 21/34* (2013.01); *G06F 21/45* (2013.01); *H04L 9/3234* (2013.01); *H04L 9/3236* (2013.01); *H04L 9/3247* (2013.01)

(58) Field of Classification Search
CPC .......... G06F 11/30; G06F 21/30; G06F 21/34; G06F 21/45; H04L 9/3247;
(Continued)

(56) References Cited

U.S. PATENT DOCUMENTS

| 6,819,986 B2* | 11/2004 | Hong | B60R 25/2081 |
| | | | 340/439 |
| 7,010,682 B2* | 3/2006 | Reinold | H04L 9/3271 |
| | | | 7/100 |

(Continued)

FOREIGN PATENT DOCUMENTS

| DE | 102008008969 A1 | 8/2009 |
| WO | 2017046805 A1 | 3/2017 |

OTHER PUBLICATIONS

Okura, Shunsuke—A Proposal of PUF Utilizing Pixel Variations in the CMOS Image Sensor, pp. 66-69. [Retrieved from the Internet] URL: <http://www.imagesensors.org/Past%20Workshops/2017%20Workshop/2017%20Papers/P01.pdf>.

Dao, Yuan—CMOS Image Sensor Based Physical Unclonable Function for Smart Phone Security Applications, pp. 1-4 [Retrieved from the Internet] URL: <http://www.ntu.edu.sg/home/eechenss/Papers/Conf-2014-CMOS%20image%20sensor%20based%20physical%20unclonable%20function%20for%20smart%20phone%20security%20applications.pdf>.

(Continued)

*Primary Examiner* — Oleg Korsak
(74) *Attorney, Agent, or Firm* — Design IP

(57) ABSTRACT

An authentication system includes a plurality of vehicle components each having a characteristic; a plurality of sensors, each associated with a different one of a plurality of vehicle components, each of the plurality of sensors configured to generate sensor data representative of the characteristic of a corresponding vehicle component associated therewith; and at least one processor configured to receive the sensor data from the plurality of sensors, generate a plurality of component signatures based on the received sensor data, combine the plurality of component signatures into a multi-component fingerprint, store the multi-component fingerprint in a secure element, and authenticate the first and the second vehicle component based on the multi-component fingerprint stored in the secure element, where each of the plurality of component signatures is unique to a different one of the plurality of vehicle components, and the multi-component fingerprint is unique to the plurality of vehicle components.

21 Claims, 2 Drawing Sheets

(58) Field of Classification Search
CPC . H04L 2209/84; H04L 9/0866; H04L 9/3234; H04L 9/3236
See application file for complete search history.

(56) References Cited

U.S. PATENT DOCUMENTS

| | | | |
|---|---|---|---|
| 7,092,808 B2* | 8/2006 | Lu | B60R 21/01336 180/271 |
| 10,637,647 B2* | 4/2020 | Temple | H04L 9/0643 |
| 10,757,114 B2* | 8/2020 | Ruvio | G06F 21/55 |
| 2004/0003227 A1 | 1/2004 | Reinold et al. | |
| 2017/0201385 A1* | 7/2017 | Kravitz | H04L 67/125 |
| 2019/0149324 A1* | 5/2019 | Kong | H04L 9/3236 713/171 |

OTHER PUBLICATIONS

Dao, Yuan—CMOS Image Sensor based Physical Unclonable Function for Coherent Sensor-level Authentication, pp. 1-12 [Retrieved from the Internet] URL: <https://dr.ntu.edu.sg/bitstream/handle/10220/40368/CMOS%20image.%20sensor%20based%20physical%20unclonable%20function%20for%20coherent%20sensor-level%20authentication.pdf?sequence=1&isAllowed=y>.

* cited by examiner

PAIRING DEVICES TO AN AUTHENTICATION DEVICE BY SENSOR FINGERPRINTING

FIELD

The present disclosure relates generally to pairing devices to an authentication device by sensor fingerprinting.

BACKGROUND

Security has become an important aspect in vehicle electronics systems and peripherals. For example, high value peripherals in vehicles may be a target for theft or counterfeiting, which may then be integrated into another vehicle. Without a security function to authenticate these peripherals, there may be little to deter these illegal acts. Furthermore, inferior counterfeit peripherals may not be in compliance with safety regulations and may create unsafe and unreliable conditions in a vehicle. Therefore, there is an importance to pair each peripheral to a vehicle such that they are disabled in other vehicles. For this purpose, an authentication device may be integrated into a vehicle to include a secure root of trust. Still, pairing this authentication device to the peripherals is usually done using generic serial numbers, which may be susceptible to manipulation. Furthermore, using certificates or serial numbers have to be generated beforehand and there is no direct connection or pairing to the vehicle itself.

Therefore, an improved system having increased security with respect to potential theft as a deterrent in a vehicle may be desired.

SUMMARY

Embodiments relate to authentication system in which one or more devices are paired to a authentication device by sensor fingerprinting, and to methods for performing the same.

According to one or more embodiments, an authentication system is provided. The authentication system includes a first vehicle component integrated within a vehicle, the first vehicle component having a first characteristic; a second vehicle component integrated within the vehicle, the second vehicle component having a second characteristic; a first sensor associated with the first vehicle component and configured to generate first sensor data representative of the first characteristic; a second sensor associated with the second vehicle component and configured to generate second sensor data representative of the second characteristic; and an authentication device including as least one processor and a primary secure element, the authentication device configured to receive the first sensor data and the second sensor data, generate a first component signature based on the received first sensor data, the first component signature being unique to the first vehicle component, generate a second component signature based on the received second sensor data, the second component signature being unique to the second vehicle component, combine the first and the second component signatures to generate a multi-component fingerprint of the vehicle, and store the multi-component fingerprint in the primary secure element.

According to one or more embodiments, an authentication system is provided. The authentication system includes a plurality of vehicle components each having a characteristic; a plurality of sensors, each associated with a different one of a plurality of vehicle components, each of the plurality of sensors configured to generate sensor data representative of the characteristic of a corresponding vehicle component associated therewith; a secure element; and at least one processor configured to receive the sensor data from the plurality of sensors, generate a plurality of component signatures based on the received sensor data, combine the plurality of component signatures into a multi-component fingerprint, store the multi-component fingerprint in the secure element, and authenticate the first vehicle component and the second vehicle component based on the multi-component fingerprint stored in the secure element, wherein each of the plurality of component signatures is unique to a different one of the plurality of vehicle components, and the multi-component fingerprint is unique to the plurality of vehicle components.

According to one or more embodiments, a method of generating a multi-component fingerprint for a vehicle is provided. The method includes generating first sensor data representative of a first characteristic of a first vehicle component; generating second sensor data representative of a second characteristic of a second vehicle component; generating a first component signature based on the first sensor data; generating a second component signature based on the second sensor data; generating the multi-component fingerprint by combining the first component signature and the second component signature; securely storing the multi-component fingerprint in a secure element; and authenticating the first vehicle component and the second vehicle component based on the multi-component fingerprint stored in the secure element. The first component signature is a first identifier that is unique to the first vehicle component, the second component signature is a second identifier that is unique to the second vehicle component, and the multi-component fingerprint is a unique identifier for the vehicle.

BRIEF DESCRIPTION OF THE DRAWINGS

Embodiments are described herein making reference to the appended drawings.

DETAILED DESCRIPTION

Figure 1:
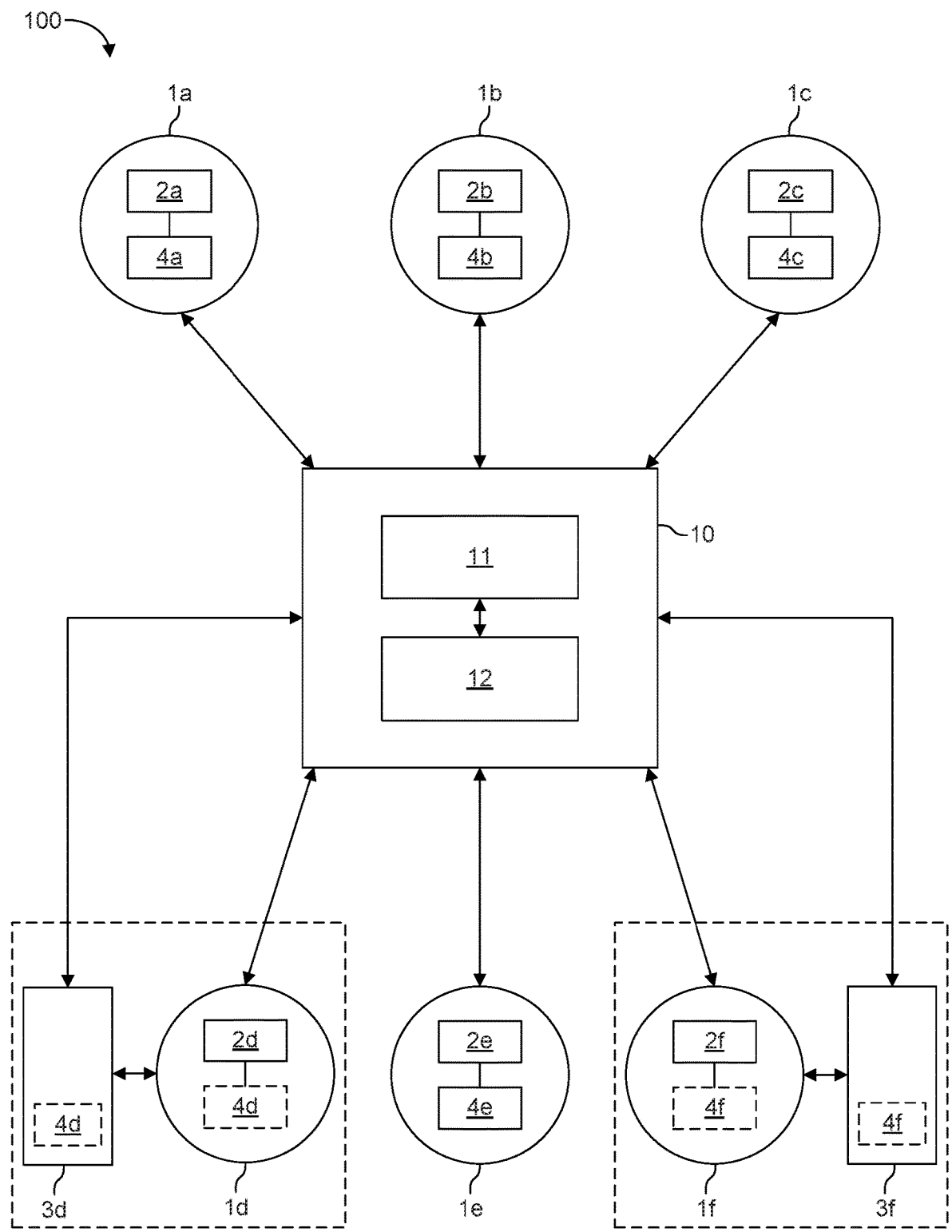
FIG. 1 is a schematic block diagram of a vehicle authentication system 100 according to one or more embodiments.

In the following, a plurality of details are set forth to provide a more thorough explanation of the exemplary embodiments. However, it will be apparent to those skilled in the art that embodiments may be practiced without these specific details. In other instances, well-known structures and devices are shown in block diagram form or in a schematic view rather than in detail in order to avoid obscuring the embodiments. In addition, features of the different embodiments described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In embodiments described herein or shown in the drawings, any direct electrical connection or coupling, i.e., any connection or coupling without additional intervening elements, may also be implemented by an indirect connection or coupling, i.e., a connection or coupling with one or more additional intervening elements, or vice versa, as long as the general purpose of the connection or coupling, for example, to transmit a certain kind of signal or to transmit a certain kind of information, is essentially maintained. Features from different embodiments may be combined to form further embodiments. For example, variations or modifications described with respect to one of the embodiments may also be applicable to other embodiments unless noted to the contrary.

Signal conditioning, as used herein, refers to manipulating an analog signal in such a way that the signal meets the requirements of a next stage for further processing. Signal conditioning may include converting from analog to digital (e.g., via an analog-to-digital converter), amplification, filtering, converting, biasing, range matching, isolation and any other processes required to make a sensor output suitable for processing after conditioning.

Embodiments relate to semiconductor components integrated in a vehicle, including sensors that use a semiconductor element for obtaining sensor data. A sensor may refer to a component which converts a physical quantity to be measured to an electric signal, for example, a current signal or a voltage signal. For example, a sensor, as described herein, may be an image sensor, a time-of-flight (ToF) sensor, a Light Detection and Ranging (LIDAR) sensor, a camera sensor, a radar sensor, a magnetic sensor, a pressure sensor, a temperature sensor, and the like. The physical quantity may, for example, comprise a magnetic field, an electric field, light waves or beams, radio waves, a pressure, a temperature, a force, a current, or a voltage, but is not limited thereto.

A magnetic field sensor, for example, includes one or more magnetic field sensor elements, each being a semiconductor element that measures one or more characteristics of a magnetic field (e.g., an amount of magnetic field flux density, a field strength, a field angle, a field direction, a field orientation, etc.) corresponding to detecting and/or measuring the magnetic field pattern of an element that generates the magnetic field (e.g., a magnet, a current-carrying conductor (e.g. a wire), the Earth, or other magnetic field source).

A LIDAR sensor includes one or more photosensitive elements, each being a semiconductor element that measures light received from an environment and generates a voltage based on the intensity of the received light.

The sensor circuit may be referred to as a signal processing circuit and/or a signal conditioning circuit that receives the signal (i.e., analog sensor signal) from one or more sensor elements in the form of raw measurement data and derives, from the sensor signal, a measurement signal that represents the physical quantity. The sensor circuit may include an analog-to-digital converter (ADC) that converts the analog sensor signal from the one or more sensor elements to a digital signal. The sensor circuit may also include a digital signal processor (DSP) that performs some processing on the digital signal.

A sensor device, as used herein, may refer to a device which includes a sensor and a sensor circuit which conditions and amplifies the small signal of the sensor via signal processing and/or conditioning, and performs additional processing based on the measurement signal derived therefrom. A sensor device may be integrated on a single semiconductor die (e.g., silicon die or chip), although, in other embodiments, a plurality of dies may be used for implementing a sensor device. Thus, the sensor and the sensor circuit are disposed on either the same semiconductor die or on multiple dies in the same package. For example, the sensor might be on one die and the sensor circuit on another die such that they are electrically connected to each other within the package. In this case, the dies may be comprised of the same or different semiconductor materials, such as GaAs and Si, or the sensor might be sputtered to a ceramic or glass platelet, which is not a semiconductor.

It will be appreciated that the terms "microprocessors", "processors", "processor cores", "processing units", and "processing circuitry" may be used interchangeably throughout this disclosure. An authentication device may be or may include a secure element, such as a microprocessor or microcontroller chip that is configured to securely store sensitive data and securely host applications, such as authentication verification applications. The secure element acts as a vault, protecting what is inside the secure element (i.e., stored data and applications) from malware attacks. Thus, the secure element is a tamper-resistant platform in which data is stored in a safe place and information is given to only authorized applications and users.

The authentication device, including a secure element, may be unique to, and therefore integrated with, a specific vehicle. Therefore, the authentication device includes a secure memory device configured to store a multi-component fingerprint of a vehicle and at least one processor configured securely run authentication verification applications. For example, the authentication device may be configured to create a multi-component fingerprint of a vehicle, securely store the multi-component fingerprint, receive authentication information from each vehicle component, and authenticate that vehicle component by comparing the authentication information to the stored sensor fingerprint. The authentication device may also be configured to run an authentication diagnostic of the vehicle and to update the multi-component fingerprint based on one or more evaluated vehicle components. The authentication device is capable of detecting manipulation of the entire vehicle system.

The multi-component fingerprint may be used by the authentication device to create a unique certificate, or used as a physical unclonable function (PUF) or a unique vehicle identifier (ID). For example, a hash of the multi-component fingerprint may be stored in the tamperproof region of the authentication device's nonvolatile memory (NVM) (i.e., in a secure element) or the hash of the fingerprint may be used during the generation of a certificate at the vehicle manufacture. The component signatures may also be used as PUFs.

A multi-component fingerprint is made up of a combination or two or more component signatures, where each component signature is unique to a vehicle component in the vehicle. A component signature is representative of a unique behavior or characteristic of a vehicle component. A vehicle component is a vehicle peripheral, device, or family of devices that has a unique signature due to a unique behavior or characteristic of that vehicle component. For example, a vehicle component may be a sensor (e.g., an image sensor, a ToF sensor, a LIDAR sensor, a camera sensor, a radar sensor, a magnetic field sensor, an electric field sensor, a pressure sensor, a temperature sensor, etc.) integrated within the vehicle or an electronic or electromechanical component integrated within the vehicle that generates an measurable physical quantity during operation that can be interpreted as a unique signature associated with that electronic component. The unique signature can be stored in a secure element and used as an ID for that vehicle component.

As noted above, a sensor may include one or more semiconductor elements. Each semiconductor element exhibits a unique behavior or characteristic due to their unique composition that can be measured as a measurable physical quantity and interpreted as a unique signature associated with that sensor. That is, it is possible to analyze a behavior or a characteristic of a sensor from a measurable property of the semiconductor element(s) thereof, and derive a component signature therefrom.

For example, each ToF sensor has a unique ToF sensor property, one of which may be a dark current of the ToF pixels. Dark current is a relatively small electric current that flows through photosensitive devices such as a photomultiplier tube, photodiode, or charge-coupled device even when no photons are entering the device. It consists of the charges generated in the detector when no outside radiation is entering the detector. It may also be referred to as reverse bias leakage current in non-optical devices and is present in all diodes. Physically, dark current is due to the random generation of electrons and holes within the depletion region of the device.

In a ToF sensor, each ToF pixel has its own unique dark current. Thus, the dark current of each ToF pixel can be measured by a sensor circuit of the ToF sensor to generate a fixed pattern of noise in a dark condition that is representative of the arrangement of ToF pixels of the ToF sensor. In other words, by measuring the dark current of each ToF pixel, a fixed pattern of noise can be generated that is unique to the ToF sensor. This fixed pattern of noise can be used as a component signature of the ToF sensor that can be used to identify the ToF sensor itself.

It is to be noted that two ToF sensors, while composed of similar elements (e.g., a same number of ToF pixels arranged according to a same matrix array), would have unique sensor properties that are distinguishable from each other. For example, the fixed pattern of noise derived from measuring the dark current of their respective ToF pixels would be different from each other. Hence, making this property unique and allowing it to be used as a component signature that is linked to that specific vehicle component. In other words, even if two sensors are of the same type, each sensor has a unique signature that can be detected and used to identify that sensor.

Similarly, each LIDAR sensor has a unique LIDAR sensor property, one of which may be a dark current of the photodiodes used in the sensor. Another unique sensor property of a LIDAR sensor may be a microelectromechanical systems (MEMS) mirror resonance frequency of a MEMS mirror used in the transmitter of the LIDAR sensor, or a decay frequency of the MEMS mirror that is measured when a driver of the MEMS mirror stops driving the MEMS mirror. A driver circuit of the LIDAR sensor may measure one or both or these properties to be used to derive a component signature therefrom.

It will be appreciated that an image sensor has unique image sensor properties, a camera sensor has unique camera sensor properties, a radar sensor has unique radar sensor properties, a magnetic sensor has unique magnetic sensor properties, a tire pressure sensor has unique tire pressure sensor properties, a temperature sensor has unique temperature sensor properties, and so on.

In addition, an electromechanical component may be a electronic power train comprising a family of devices (e.g., power switches, a starter, etc.) that, separately or in combination, have a unique property during a specific high power operation of the electronic power train. For instance, during a start operation of a motor, a profile of a surge current produced at the electronic power train (e.g., at the starter) during the start operation is unique. Thus, the electronic power train may generate an electric current that has a unique profile during a specific phase of operation. This electric current may be detected by a current sensor located in proximity to the electronic power train and used to create a current profile that serves as a unique electric signature of the electronic power train, or of a sub-component of the electronic power train, like the starter itself.

Therefore, a component signature may be derived directly from a vehicle component (e.g., via information or sensor data provided directly by that vehicle component, such as dark current) or indirectly by the use of a sensor that measures a physical quantity of the vehicle component (e.g. via a current sensor that measures an electric current generated by the vehicle component during an operation of the vehicle component).

FIG. 1 is a schematic block diagram of a vehicle authentication system 100 according to one or more embodiments. The vehicle authentication system 100 includes multiple sensors 1a-1f integrated within a vehicle. In addition to including at least one sensor element configured to measure a physical quality, each sensor 1a-1f includes a sensor circuit 2a-2f and a secure element 4a-4d. Each sensor circuit 2a-2f is configured to receive raw analog sensor signals generated by at least one a sensor element, and perform processing thereon. The processing of the raw analog sensor signals may include analog post processing to remove singular measurement artifacts from the raw analog sensor signals to generate a post-processed analog sensor signal, digitization via an ADC to convert the analog sensor signal (i.e., either raw or post-processed) to a digital sensor signal, and/or digital post processing to filter or remove singular measurement artifacts from the digital signal to generate a post-processed digital signal.

Depending on the type of sensor, a sensor 1a-1f may be configured to output sensor data in any form described above, and may not include one or more of the signal processing steps. In other words, some sensors may output raw analog sensor signals, post-processed analog sensor signals, digital sensor signals, or post-processed digital signals as the sensor data. Here the sensor data is or is representative of a component signature of a vehicle component.

Some sensors may themselves be a vehicle component that measure and output sensor data directly from the vehicle component that is indicative of a behavior or characteristic of the vehicle component, as described above. Other sensors may be coupled to (e.g., via a circuit connection) or located in proximity to a vehicle component (e.g., to detect an electric field or a magnetic field produced by the vehicle component), and output sensor data indicative of a behavior or characteristic of the vehicle component. In this example, sensors 1a, 1b, 1c, and 1e are vehicle components, such as an image sensor, a ToF sensor, a LIDAR sensor, a camera sensor, a radar sensor, a magnetic field sensor, an electric field sensor, a pressure sensor, or a temperature sensor, but is not limited thereto. Whereas, sensors 1*d* and 1*f* are sensors that measure a property of a corresponding vehicle component 3*d* and 3*f*. Sensors 1*d* and 1*f* may be a magnetic field sensor, an electric field sensor, a current sensor, or a voltage sensor, but is not limited thereto.

Each vehicle component (i.e., 1*a*, 1*b*, 1*c*, 1*e*, 4*d* and 4*f*) are associated with their own secure element 4*a*-4*f*. For sensors 1*a*, 1*b*, 1*c*, and 1*e*, each sensor includes the secure element. For vehicle components 3*d* and 3*f*, their corresponding sensors 1*d* and 1*f* may include the secure element, or the secure element may be provided at the vehicle component 3*d* and 3*f*. Each secure element 4*a*-4*f* is configured to securely store the component signature of its corresponding vehicle component. As will be described in more detail, this component signature may be generated by the sensor circuit, by signal processing described above, or by an authentication device 10.

The vehicle authentication system 100 further includes an authentication device 10 that includes a processor 11 and a secure element 12, with the secure element being a tamper-proof region of the authentication device's nonvolatile memory (NVM). The authentication device 10 is communicatively coupled to each sensor 1*a*-1*f*, and may be further coupled to vehicle components 3*d* and 3*f* for communication therewith. The processor 11 may be comprised of multiple processors or processing circuits. Furthermore, the processor 11 may be configured to receive and store sensor data in any form (i.e., raw analog sensor signals, post-processed analog sensor signals, digital sensor signals, or post-processed digital signals) and preform signal processing and conditioning thereon to generate a component signature for each vehicle component (e.g., 1*a*, 1*b*, 1*c*, 1*e*, 4*d* and 4*f*). A component signature is a digital representation of a unique behavior or characteristic of a vehicle component.

The generation of a component signature may include generating a signature profile based on multiple sensor data points either taken from multiple sub-components of a vehicle component (e.g., multiple sensor pixels or multiple power switches) or over a period of time (e.g., measuring a surge current generated over a duration of a start operation of a motor).

The processor 11 may further apply a correction function to sensor data to compensate for aging and temperature variations. The processor 11 may be an application processor that is configured, among other things, to host one or more applications for generating component signatures, hashes, and digital signatures, as well as perform authentication verification and error detection.

For instance, some unique semiconductor properties of a vehicle component may change over the lifetime of the vehicle component due to aging. Some unique semiconductor properties may change due to temperature. Some unique semiconductor properties may vary due to variations in manufacturing processes. By knowing the aging behavior of these unique semiconductor properties, by knowing how temperature affects the unique semiconductor properties, or by knowing a manufacturing variation, a correction function for compensation can be used to correct sensor data. This corrected sensor data may be used as a component signature.

The processor 11 is configured to take the component signatures from various vehicle components and combine (e.g., package together) them into a multi-component fingerprint and securely store the multi-component fingerprint in the secure element 12. In the case of receiving analog measurements from several data points (i.e., several sensors), the processor 11 generates the component signatures for each data point from the analog measurements, and uses the component signatures to generate a stable digital multi-component fingerprint.

Since each vehicle component is unique to the vehicle and each component signature is unique to a corresponding vehicle component, the combination of multiple component signatures in the form of a multi-component fingerprint serves as a unique vehicle ID that is directly paired with the vehicle. The processor 11 may also transmit the multi-component fingerprint to each secure element 3*a*-3*f* such that each vehicle component is paired with the authentication device 10 that is integrated within the vehicle. In this way, each vehicle component is paired with the vehicle.

In the process of storing the multi-component fingerprint in each secure element 3*a*-3*f* and 12, the processor may apply a cryptographic hashing function to the multi-component fingerprint to generate a hash of the multi-component fingerprint, and securely store the hash in each secure element 3*a*-3*f* and 12. Thus, the processor 11 may store the multi-component fingerprint and/or the hash of the multi-component fingerprint in each secure element 3*a*-3*f* and 12, with the hash being a more secure method. In addition, the hash may be used to generate a public key certificate or digital signature.

To generate a digital signature, a signature algorithm is applied to the hash to encrypt the hash using a signer's private key in order to generate the digital signature. A digital signature is a number cryptographically tied to a message (e.g., the multi-component fingerprint) with public key. Every digital signature requires a public-private key pair and a hash function. The hash function is used to take the message and replace it with a unique digest (i.e., the hash), the private key is used to sign the hash to generate the digital signature, and the public key certificate is used to verify the digital signature.

The hash of the multi-component fingerprint may also be used during the generation of the public key certificate at the vehicle manufacturer, and stored in a database with information that associates the public key certificate to the vehicle. The multi-component fingerprint can also be stored during vehicle manufacturing into the database of the manufacturer, in combination with the public key certificate. Thus, the processor 11 may be configured to generate the multi-component fingerprint and a hash thereof, and transmit both to the manufacture's database.

The multi-component fingerprint can be stored during vehicle manufacturing into a database of the manufacturer, in combination with the public key certificate. This data can then be used during maintenance in approved maintenance workshops to verify whether all multi-component fingerprints (triggering a new measurement) and certificates match the ones in the manufacturer's database.

For example, the processor 11 may receive a command to start a authentication process or initiate a self-test periodically. The authentication process includes generating a test multi-component fingerprint (i.e., an actual multi-component fingerprint) by taking new sensor measurements, applying age and temperature compensations to the component signatures derived therefrom to normalize the component signatures, and combining the component signatures into the test multi-component fingerprint. The authentication process further includes comparing the test multi-component fingerprint with a multi-component fingerprint (i.e., a reference multi-component fingerprint) stored in the secure element 12 or stored in the manufacture's database. If the comparison results in a match, the processor 11 can confirm that the vehicle components are authentic and verified. If the comparison results in a mismatch, the processor 11 can trigger an error message that indicates that at least one vehicle component is not authentic and/or verified.

In the event the processor 11 detects an error, the processor 11 may determine which vehicle component is not authentic or verified and transmit the information in the error message. For example, the processor 11 may send a request to each vehicle component to provide the multi-component fingerprint stored in its corresponding secure element 3a-3f, and in some cases may send the request directly to each secure element 3a-3f. Upon receiving the multi-component fingerprints stored in the secure elements 3a-3a, the processor 11 is configured to compare each multi-component fingerprint to the multi-component fingerprint retrieved from the secure element 12 or from the manufacture's database. A match indicates that a vehicle component is authentic and verified, and a mismatch indicates that a vehicle component is not authentic and/or verified.

Alternatively, the processor 11 may extract each component signature from the multi-component fingerprint stored in the secure element 12 or the manufacture's database, and compare each extracted component signature with a component signature used to generate the test multi-component fingerprint, or with a new component signatures generated from new measurements. Again, a match indicates that a vehicle component is authentic and verified, and a mismatch indicates that a vehicle component is not authentic and/or verified.

Thus, a manufacture or an authorized maintenance shop can verify whether devices installed in a vehicle match the fingerprints in a database. Furthermore, certificates in each corresponding secure element can carry a signature of the fingerprint. By verifying certificates stored in the secure elements, the processor 11 can also verify that the fingerprint is genuine. The vehicle via processor 11 can indicate to a user during operation that fingerprints and certificates do not match.

In the end, an authorized maintenance shop can ensure that no counterfeits are installed in a vehicle. The manufacturer also is able to obtain data on which vehicle components are stolen or counterfeited.

In addition, upon installing a new vehicle component, the authorized maintenance shop may trigger a new multi-component fingerprint to be generated and stored in the secure elements 3a-3f and 12, as well as the manufacture's database and an updated multi-component fingerprint. A new hash may also be generated by the processor 11.

In view of the above, the authentication device 10 is configured to create a unique vehicle fingerprint based on the unique properties of integrated semiconductor components and other vehicle components that can be measured through sensor data. The measurements taken from sensor data are used to extract unique signature associated with a specific vehicle component, and the unique signature of various vehicle components are combined to create the unique vehicle fingerprint. This vehicle-fingerprint can then be used for any security-related application, such as exchange and integration of only authentic vehicle components or as a vehicle ID to be used in vehicle-to-vehicle communications (or other machine-to-machine communications). Thus, the multi-component fingerprint can be used in a similar manner to a PUF.

Figure 2:
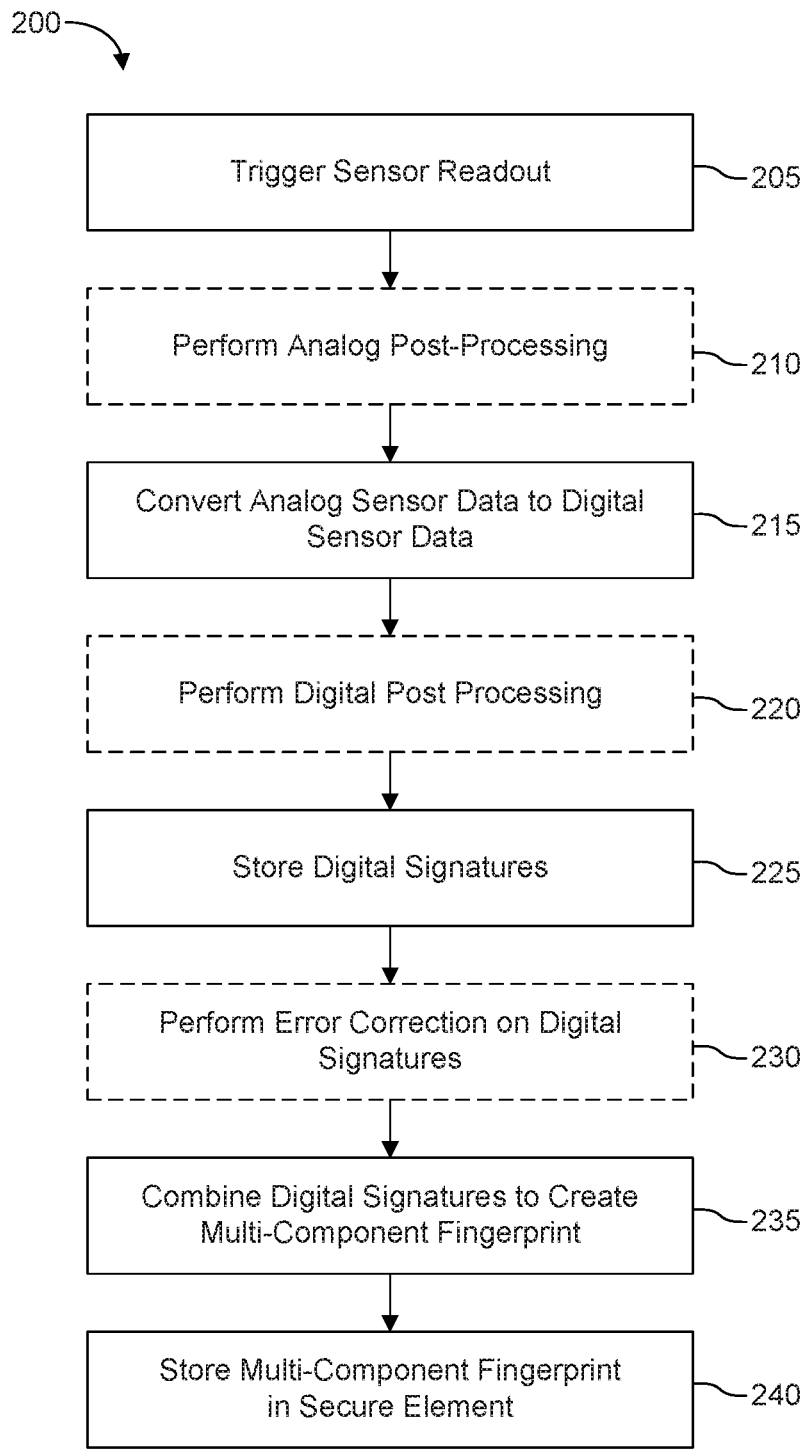
FIG. 2 shows a flow diagram of a method for generating a multi-component fingerprint according to one or more embodiments.

FIG. 2 shows a flow diagram of a method 200 for generating a multi-component fingerprint according to one or more embodiments. The method 200 may include operations that are optional depending on the senor type or type of sensor data generated. These optional operations are indicated by boxes with dotted outlines.

Method 200 includes triggering a sensor readout of multiple sensors in a vehicle (operation 205). Each sensor readout includes reading out a sensor signal that includes sensor data representative of a unique behavior or characteristic of a corresponding vehicle component. A processor (i.e., either at the sensor or at an application processor) is configured to perform analog post processing to remove singular measurement artifacts from the raw analog sensor signals to generate a post-processed analog sensor signal (operation 210), to convert analog sensor signal (i.e., either raw or post-processed) to a digital sensor signal (operation 215), and to perform digital post processing to filter or remove singular measurement artifacts from the digital signal to generate a post-processed digital signal (operation 220).

An application processor is configured to store the digital signals (i.e., either raw or post-processed) of the corresponding vehicle component as a digital signature thereof (operation 225). Additionally, the application processor may perform further processing on one or more digital signals in order to generate the digital signature of the corresponding vehicle component prior to storing the digital signature. The processor 11 may further apply a correction function to sensor data or to a digital signature to compensate for aging and temperature variations, and store the corrected digital signature (operation 230).

Once all digital signatures are stored, the application processor is configured to combine the digital signatures into a multi-component fingerprint that is unique to the vehicle (operation 235). The application processor may then store the multi-component fingerprint in a secure element by transmitting the multi-component fingerprint thereto (operation 240).

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the method steps may be executed by such an apparatus.

Depending on certain implementation requirements, embodiments provided herein can be implemented in hardware or in software. The implementation can be performed using a computer readable, digital storage medium, for example a floppy disk, a DVD, a Blue-Ray, a CD, a RAM, a ROM, a PROM, an EPROM, an EEPROM or a FLASH memory, having electronically readable control signals stored thereon, which cooperate (or are capable of cooperating) with a programmable computer system such that the respective method is performed.

Instructions may be executed by one or more processors, such as one or more central processing units (CPU), digital signal processors (DSPs), general purpose microprocessors, application specific integrated circuits (ASICs), field programmable gate (or logic) arrays (FPGAs), or other equivalent integrated or discrete logic circuitry. Accordingly, the term "processor," as used herein refers to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The above described exemplary embodiments are merely illustrative. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

What is claimed is:

1. An authentication system, comprising:
a first vehicle component integrated within a vehicle, the first vehicle component having a first characteristic;
a second vehicle component integrated within the vehicle, the second vehicle component having a second characteristic;
a first sensor associated with the first vehicle component and configured to generate first sensor data representative of the first characteristic;
a second sensor associated with the second vehicle component and configured to generate second sensor data representative of the second characteristic; and
an authentication device comprising as least one processor and a primary secure element, the authentication device configured to receive the first sensor data and the second sensor data, generate a first component signature based on the received first sensor data, the first component signature being unique to the first vehicle component, generate a second component signature based on the received second sensor data, the second component signature being unique to the second vehicle component, combine the first and the second component signatures to generate a multi-component fingerprint of the vehicle, and store the multi-component fingerprint in the primary secure element,
wherein the first vehicle component and the second vehicle component each include a secondary secure element each configured to securely store the multi-component fingerprint, and
the authentication device is configured to authenticate the first vehicle component by comparing the multi-component fingerprint stored in the primary secure element with the multi-component fingerprint stored in the secondary secure element of the first vehicle component, and authenticate the second vehicle component by comparing the multi-component fingerprint stored in the primary secure store with the multi-component fingerprint stored in the secondary secure element of the second vehicle component.

2. The authentication system of claim 1, wherein the authentication device is configured to apply a hash function to the multi-component fingerprint to generate a hash of the multi-component fingerprint and store the hash as the multi-component fingerprint in the primary secure element.

3. The authentication system of claim 1, wherein first component signature is a first identifier that is unique to the first vehicle component and the second component signature is a second identifier that is unique to the second vehicle component.

4. The authentication system of claim 1, wherein the multi-component fingerprint is a unique identifier for the vehicle.

5. The authentication system of claim 1, wherein at least one of the first sensor and the second sensor is integrated with the first vehicle component and the second vehicle component, respectively.

6. The authentication system of claim 1, wherein the authentication device is configured to compensate the first sensor data for at least one of aging effects and temperature effects, and generate the first component signature based on the compensated first sensor data.

7. The authentication system of claim 1, wherein the authentication device is configured to authenticate the first vehicle component and the second vehicle component based on the multi-component fingerprint stored in the primary secure element.

8. The authentication system of claim 1, wherein the at least one processor is configured to update the multi-component fingerprint of the vehicle upon installation of a further vehicle component in the vehicle and store the updated multi-component fingerprint in the primary secure element.

9. The authentication system of claim 1, wherein the authentication device is configured generate an error signal on a condition that there is a mismatch between the multi-component fingerprint stored in the primary secure store and the multi-component fingerprint stored in the secondary secure element of the first vehicle component, or a mismatch between the multi-component fingerprint stored in the primary secure store and the multi-component fingerprint stored in the secondary secure element of the second vehicle component.

10. The authentication system of claim 1, wherein the authentication device is configured to authenticate the first vehicle component and the second vehicle component, including receiving test sensor data from the first sensor and the second sensor, generating a test multi-component fingerprint based on the test sensor data, retrieving the multi-component fingerprint from the primary secure element, and comparing the retrieved multi-component fingerprint with the test multi-component fingerprint.

11. The authentication system of claim 10, wherein the authentication device is configured to generate an error signal on a condition that there is a mismatch between the retrieved multi-component fingerprint and the test multi-component fingerprint.

12. The authentication system of claim 1, wherein:
the first sensor is configured to measure a physical quantity of the first characteristic of the first vehicle component in order to generate the first sensor data representative of the first characteristic,
the first component signature is unique to the first vehicle component as a result of being derived from the measured physical quantity of the first characteristic,
the second sensor is configured to measure a physical quantity of the second characteristic of the second vehicle component in order to generate the second sensor data representative of the second characteristic, and
the second component signature is unique to the second vehicle component as a result of being derived from the measured physical quantity of the second characteristic.

13. The authentication system of claim 1, wherein the first vehicle component is selected from the group consisting of an image sensor, a time-of-flight (ToF) sensor, a Light Detection and Ranging (LIDAR) sensor, a camera sensor, a radar sensor, a magnetic sensor, a pressure sensor, and a temperature sensor, and the first sensor is at least one sensor element of the first vehicle component.

14. The authentication system of claim 13, wherein the second vehicle component is selected from the group consisting of an image sensor, a ToF sensor, a LIDAR sensor, a camera sensor, a radar sensor, a magnetic sensor, a pressure sensor, and a temperature sensor, and
the second sensor is at least one sensor element of the second vehicle component.

15. The authentication system of claim 13, wherein the second vehicle component is an electromechanical component of the vehicle, and
the second sensor is selected from the group consisting of a current sensor, a voltage sensor, and a magnetic sensor.

16. The authentication system of claim 15, wherein the second vehicle component is at least one component of an electronic power train of the vehicle.

17. An authentication system, comprising:
a first vehicle component integrated within a vehicle, the first vehicle component having a first characteristic;
a second vehicle component integrated within the vehicle, the second vehicle component having a second characteristic;
a first sensor associated with the first vehicle component and configured to generate first sensor data representative of the first characteristic;
a second sensor associated with the second vehicle component and configured to generate second sensor data representative of the second characteristic; and
an authentication device comprising as least one processor and a primary secure element, the authentication device configured to receive the first sensor data and the second sensor data, generate a first component signature based on the received first sensor data, the first component signature being unique to the first vehicle component, generate a second component signature based on the received second sensor data, the second component signature being unique to the second vehicle component, combine the first and the second component signatures to generate a multi-component fingerprint of the vehicle, and store the multi-component fingerprint in the primary secure element,
wherein the authentication device is configured retrieve the multi-component fingerprint from the primary secure element and extract the first component signature and the second component signature therefrom, receive first test sensor data representative of the first characteristic from the first sensor, receive second test sensor data representative of the second characteristic from the first sensor, generate a first test component signature from first test sensor data, generate a second test component signature from second test sensor data, compare the first test component signature with the extracted first component signature, and compare the second test component signature with the extracted second component signature.

18. The authentication system of claim 17, wherein the authentication device is configured to generate a first error signal on a condition that there is a mismatch between the first test component signature with the extracted first component signature, and generate a second error signal on a condition that there is a mismatch between the second test component signature with the extracted second component signature,
wherein the first error signal indicates that the first vehicle component is not authorized, and
wherein the second error signal indicates that the second vehicle component is not authorized.

19. An authentication system, comprising:
a plurality of vehicle components each having a corresponding characteristic;
a plurality of sensors, each associated with a different one of a plurality of vehicle components, each of the plurality of sensors configured to generate sensor data representative of the corresponding characteristic of a corresponding vehicle component associated therewith;
a primary secure element;
at least one processor configured to receive the sensor data from the plurality of sensors, generate a plurality of component signatures based on the received sensor data, combine the plurality of component signatures into a multi-component fingerprint, store the multi-component fingerprint in the primary secure element, and authenticate the first vehicle component and the second vehicle component based on the multi-component fingerprint stored in the primary secure element,
wherein each of the plurality of component signatures is unique to a different one of the plurality of vehicle components, and the multi-component fingerprint is unique to the plurality of vehicle components; and
a plurality of secondary secure elements each configured to securely store the multi-component fingerprint, wherein each of the plurality of vehicle components includes one of the plurality of secondary secure elements;
wherein the at least one processor is configured to authenticate a vehicle component of the plurality of vehicle components by comparing the multi-component fingerprint stored in the primary secure element with the multi-component fingerprint stored in a secondary secure element of the vehicle component.

20. A method of authentication for a vehicle, the method comprising:
generating first sensor data representative of a first characteristic of a first vehicle component;
generating second sensor data representative of a second characteristic of a second vehicle component;
generating a first component signature based on the first sensor data;
generating a second component signature based on the second sensor data;
generating a multi-component fingerprint by combining the first component signature and the second component signature;
securely storing the multi-component fingerprint in a primary secure element external to the first vehicle component and the second vehicle component;
securely storing the multi-component fingerprint in a plurality of secondary secure elements, wherein each of the first and the second vehicle components includes one of the plurality of secondary secure elements;
authenticating the first vehicle component and the second vehicle component based on the multi-component fingerprint stored in the primary secure element, including authenticating the first vehicle component by comparing the multi-component fingerprint stored in the primary secure element with the multi-component fingerprint stored in a secondary secure element of the first vehicle component, and authenticating the second vehicle component by comparing the multi-component fingerprint stored in the primary secure store with the multi-component fingerprint stored in a secondary secure element of the second vehicle component,
wherein the first component signature is a first identifier that is unique to the first vehicle component, the second component signature is a second identifier that is unique to the second vehicle component, and the multi-component fingerprint is a unique identifier for the vehicle.

21. The method of claim 20, wherein authenticating the first vehicle component and the second vehicle component comprising:
generating first test sensor data representative of the first characteristic of the first vehicle component;
generating second test sensor data representative of the second characteristic of the second vehicle component;
generating a test multi-component fingerprint based on the first test sensor data and the second test sensor data;
retrieving the multi-component fingerprint from the primary secure element;
comparing the retrieved multi-component fingerprint with the test multi-component fingerprint; and
generating an error signal on a condition that there is a mismatch between the retrieved multi-component fingerprint and the test multi-component fingerprint.

* * * * *